(12) United States Patent
Suzuki

(10) Patent No.: US 9,120,159 B2
(45) Date of Patent: Sep. 1, 2015

(54) SPINDLE DEVICE OF A MACHINE TOOL

(75) Inventor: Nobuharu Suzuki, Kanagawa (JP)

(73) Assignee: Makino Milling Machine Co., Ltd., Tokyo (JP)

(*) Notice: Subject to any disclaimer, the term of this patent is extended or adjusted under 35 U.S.C. 154(b) by 430 days.

(21) Appl. No.: 13/634,297

(22) PCT Filed: Mar. 30, 2010

(86) PCT No.: PCT/JP2010/056114
§ 371 (c)(1),
(2), (4) Date: Sep. 12, 2012

(87) PCT Pub. No.: WO2011/121793
PCT Pub. Date: Oct. 6, 2011

(65) Prior Publication Data
US 2013/0004257 A1    Jan. 3, 2013

(51) Int. Cl.
*B23B 31/30* (2006.01)
*B23B 31/26* (2006.01)

(52) U.S. Cl.
CPC ............... *B23B 31/265* (2013.01); *B23B 31/30* (2013.01); *B23B 2231/50* (2013.01); *Y10T 409/307672* (2015.01); *Y10T 409/309464* (2015.01)

(58) Field of Classification Search
CPC ........ B23B 31/10; B23B 31/26; B23B 31/30; B23C 5/26; B23Q 3/12
USPC ................................. 409/231–233
See application file for complete search history.

(56) References Cited

U.S. PATENT DOCUMENTS

| | | | | |
|---|---|---|---|---|
| 3,242,819 A | * | 3/1966 | Erikson | 409/233 |
| 5,018,916 A | * | 5/1991 | Bauch et al. | 409/233 |
| 5,039,261 A | | 8/1991 | Takada | |
| 5,052,866 A | * | 10/1991 | Bauch et al. | 409/233 |
| 5,425,606 A | * | 6/1995 | Kelch | 409/233 |
| 5,662,442 A | * | 9/1997 | Taki et al. | 409/233 |
| 6,409,441 B1 | * | 6/2002 | Lind | 409/233 |
| 6,413,027 B1 | * | 7/2002 | Lind | 409/233 |
| 2005/0220556 A1 | | 10/2005 | Takase et al. | |
| 2005/0232720 A1 | | 10/2005 | Lu | |
| 2011/0074121 A1 | * | 3/2011 | Hangleiter | 279/66 |

FOREIGN PATENT DOCUMENTS

| | | |
|---|---|---|
| DE | 3336111 C1 * | 2/1985 |
| DE | 3801509 A1 * | 7/1989 |
| DE | 3813670 A1 * | 11/1989 |
| DE | 3824580 A1 * | 1/1990 |
| DE | 4308738 A1 * | 9/1994 |
| JP | 05-116002 | 5/1993 |
| JP | 06-039612 A | 2/1994 |
| JP | 06023610 A * | 2/1994 |
| JP | 3080253 B2 | 6/2000 |
| JP | 2002540957 A | 12/2002 |
| JP | 2005288609 A | 10/2005 |
| WO | 01051239 A1 | 7/2001 |
| WO | WO 03049898 A1 * | 6/2003 |
| WO | 2004089566 A1 | 10/2004 |

* cited by examiner

*Primary Examiner* — Daniel Howell
(74) *Attorney, Agent, or Firm* — Paul & Paul

(57) ABSTRACT

Disclosed is a spindle device (5) for a machine tool such that draw bar (22) is inserted into spindle (20) which is rotatably supported in housing (12), and draw bar (22) is biased to a rear of spindle (20) by an elastic force of disc springs (23), resulting in tool holder (51) being clamped to spindle (20). Spindle device (5) is equipped with unclamping device (60) that comprises piston (63) which is provided in annular space (55) between spindle (20) and draw bar (22), and which, by means of fluid pressure, causes draw bar (22) to move toward the front of spindle (20) in resistance to the elastic force.

3 Claims, 3 Drawing Sheets

SPINDLE DEVICE OF A MACHINE TOOL

TECHNICAL FIELD

This invention relates to a spindle device of a machine tool for attaching a tool holder to a spindle by using a draw bar.

BACKGROUND ART

Tools such as an end mill, drill and boring bar are fitted to a spindle device of a machine tool through a tool holder, and are caused to move while rotating at a predetermined rotational speed relative to a work fixed on a table to thereby machine the work into a desired shape. The spindle device includes a cylindrical spindle supported in a housing so as to rotate, and a draw bar provided in the spindle and moves toward the rear of the spindle to draw the tool holder to a distal end of the spindle to clamp it. Conventional spindle devices have been disclosed in PLT 1 and 2.

A spindle device disclosed in PLT 1 is equipped with an unclamping device (draw bar drive means) which moves the draw bar toward the front of the spindle to unclamp the clamped tool holder. PLT 1 describes in paragraph 0014 that the unclamping device has a draw bar drive cylinder and a draw bar drive piston for pushing the draw bar toward the front of the spindle.

PLT 2 discloses a spindle device of a machine tool having a bearing which permits the elongation of the spindle to escape rearward. According to PLT 2, paragraph 0015, a major portion on the distal end side of the spindle is supported by a pair of angular ball bearings in a manner to rotate, and an extending portion on the rear end side of the spindle is supported by a radial ball bearing so as to manner. Referring to paragraph 0018, further, track grooves are formed in the inner circumferential surface of an outer wheel of the radial ball bearing, and the outer circumferential surface of an inner wheel is formed flat without track groove, enabling the inner wheel to move in the axial direction.

CITATION LIST

Patent Literature

PLT 1: Japanese Unexamined Patent Publication (Kokai) No. 2005-288609
PLT 2: Japanese Patent. No. 3080253

DISCLOSURE OF INVENTION

Technical Problem

According to the conventional spindle device in which a tool is attached to the distal end of the spindle via the tool holder due to the drawing force of the draw bar as described in PLT 1, the unclamping device that pushes the draw bar toward the front of the spindle is arranged on the outer side of the rear part of the spindle in order to unclamp the clamped tool. Namely, the spindle and the unclamping device are arranged in line. The same also holds true in PLT 2.

With the unclamping device being arranged on the outer side of the rear part of the spindle, however, the overall, length of the spindle device increases thereby resulting in a problem. If the spindle device has an increased overall length, the distance increases between a support point of the spindle device and a point of action where the cutting force acts on the tool attached to the distal end of the spindle resulting in an increase in the moment load that acts on the support portion of the spindle device and limiting the machining conditions into a narrow range in which the machining can be carried out maintaining stability. This problem is obvious specifically in the machine tools of the type in which the spindle device inclines or swings in the A-axis, B-axis and C-axis directions.

It is an object of the present invention to provide a spindle device of a machine tool which has a short overall length and is capable of maintaining machining stability even under many machining conditions.

Solution to Problem

In order to achieve the above object according to the present invention, there is provided a spindle device of a machine tool having a cylindrical spindle supported by a housing so as to rotate and a draw bar provided along the axis of rotation of the spindle to draw the tool holder to a distal end of the spindle to clamp it and, further, including an unclamping device supported by the housing and is provided in an annular space between the inner circumference of the spindle and the outer circumference of the draw bar.

According to the present invention as described above, the unclamping device is provided in the annular space between the spindle and the draw bar. Namely, the unclamping device is now incorporated in the spindle unlike in the conventional spindle devices in which the unclamping device was provided on the outer side of the spindle, and the spindle and the unclamping device were arranged in line. Accordingly, the overall length of the spindle device can be shorted.

According to the present invention, further, there is provided the spindle device of a machine tool, wherein the unclamping device has a piston that moves the draw bar toward the front of the spindle by utilizing the fluid pressure.

According to the present invention as described above, the unclamping device has the piston that is driven by a fluid pressure so as to move toward the front of the spindle. Therefore, the unclamping device is realized in a compact structure and is incorporated in the spindle.

According to the present invention, further, there is provided the spindle device of a machine tool, wherein the piston of the unclamping device is rotatably supported in the inner circumferential surface of the spindle by a first radial bearing, the first radial bearing being so constituted that an inner wheel or an outer wheel thereof has no track groove enabling the piston to move in the axial direction of the spindle.

According to the present invention, further, there is provided the spindle device of a machine tool, wherein the rear part of the draw bar is rotatably supported by the piston of the unclamping device via a second radial bearing, the second radial bearing being so constituted that an inner wheel or an outer wheel thereof has no track groove enabling the piston to move in the axial direction of the spindle.

According to the present invention, further, there is provided the spindle device of a machine tool, further having a spline shaft or a polygonal shaft that is rotatably supported in the inner circumference of the piston of the unclamping device and fits to a spline hole or a polygonal hole formed in the rear end of the draw bar, and a support shaft that rotates together with the draw bar and moves in the axial direction of the spindle relative to the draw bar.

BRIEF DESCRIPTION OF DRAWINGS

The above as well as other objects, features and advantages of the invention will become more obvious from the following description of preferred embodiments in conjunction with the accompanying drawings in which.

DESCRIPTION OF EMBODIMENTS

Figure 1:
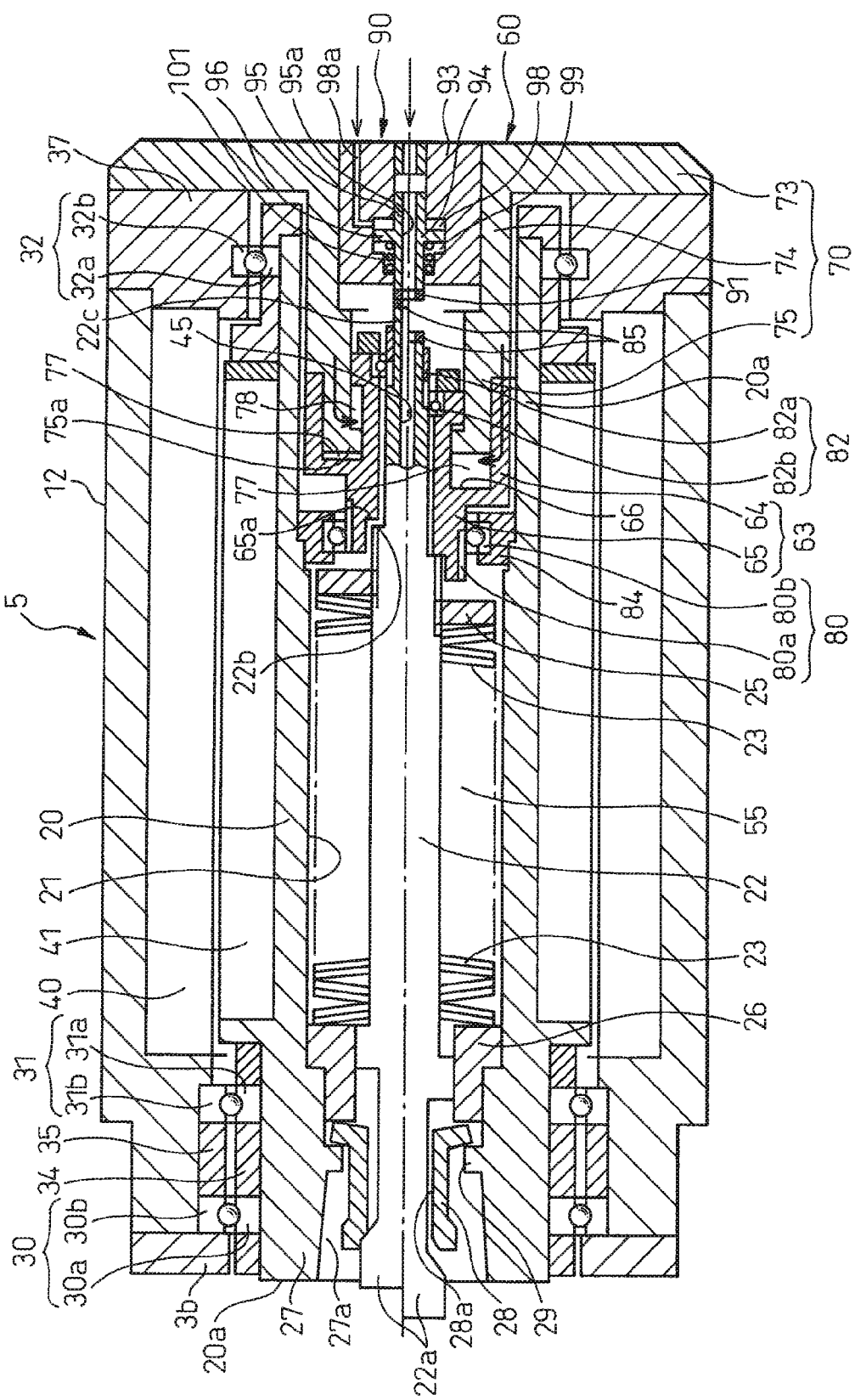
FIG. 1 is a sectional view of a spindle device in a machine tool according to a first embodiment of the present invention, wherein the upper side of the center axis shows a state where a tool holder is clamped and the lower side thereof shows an unclamped state.

Embodiments of the invention will now be concretely described and in detail with reference to the drawings.

The spindle device of the invention is for holding a tool at the distal end of the spindle through a tool holder, and comprises a draw bar provided in a cylindrical spindle to draw the tool holder to the distal end of the spindle, resilient means for urging the draw bar toward the rear of the spindle so that a drawing force acts on the tool holder, and an unclamping device provided in an annular space between the spindle and the draw bar and works to unclamp the clamped tool holder by releasing the drawing force by pushing the draw bar toward the front of the spindle overcoming the resilient force of the resilient means.

Figure 2:
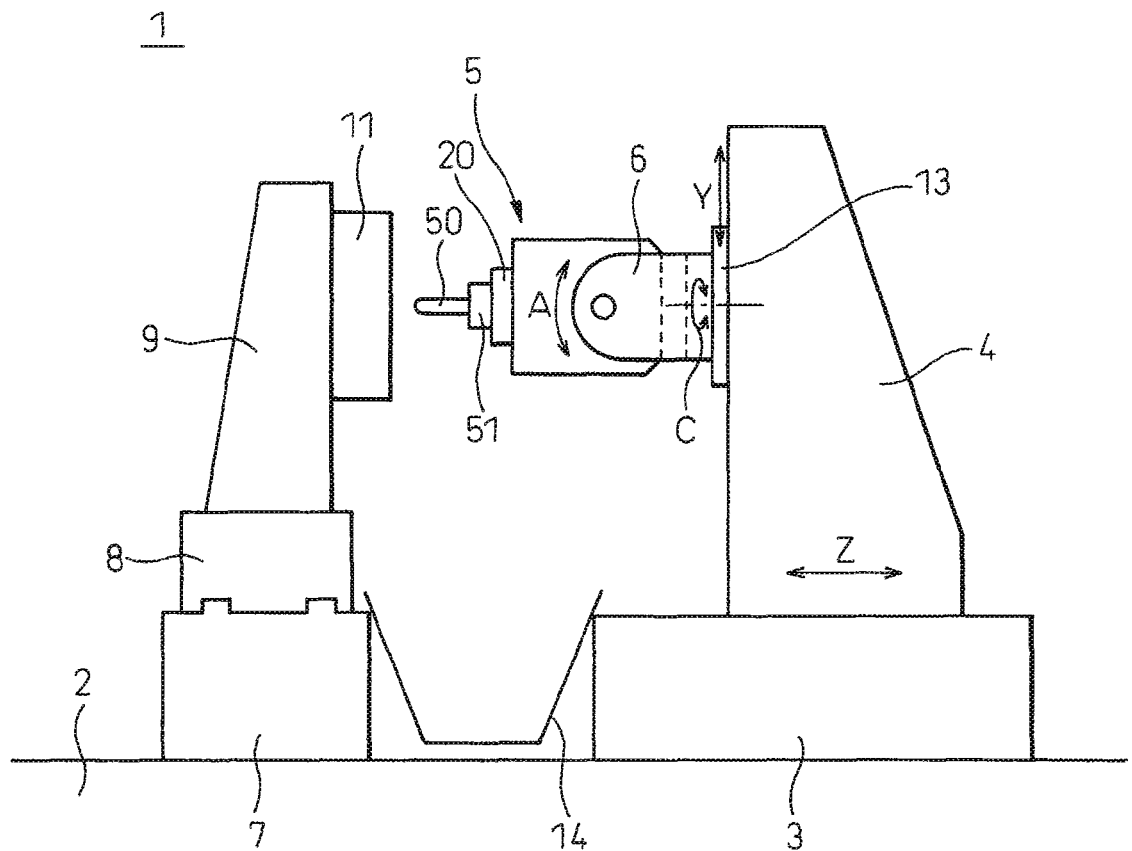
FIG. 2 is a front view showing a horizontal type machining center to which the spindle device of the machine tool shown in FIG. 1 is applied.

The machine tool to which the spindle device of the invention is applied is not limited to the horizontal type machining center shown in FIG. 2 only but include vertical type machining center and other machine tools having revolving spindles.

As FIG. 2 shows its basic constitution, horizontal type machining center 1 of this embodiment comprises a machine body having linear feed axes X, Y and Z which are orthogonal three axes and two rotary feed axes A and C, and a numerically controlled device that is not shown for operating the machine body according to a machining program. In FIG. 2, though rotary feed axis B is not shown, upon turning the C-axis by the A-axis works as the B-axis.

In horizontal type machining center 1, the X-axis, Y-axis and Z-axis which are the three linear feed axes, and the A-axis and C-axis which are the two rotary feed axes are determined in the same manner as those of the ordinary horizontal type machining center. Namely, the direction at right angles with the axis of spindle device 5 (spindle 20) and perpendicular to the surface of the paper is assumed to be to X-axis direction, the direction of height at right angles with the axis of spindle device 5 is assumed to be the Y-axis direction, and the back-and-forth direction in agreement with the axis of spindle device 5 is assumed to be the Z-axis direction. The A-axis and C-axis which are the two rotary feed axes are such that the A-axis rotates about the axis parallel with the X-axis and the C-axis rotates about the axis parallel with the Z-axis.

Machining center 1 includes first bed 3 installed on floor 2, column 4 erected on first bed 3 to move directly in the Z-axis direction, head stock 13 that directly moves in the Y-axis direction along a guide rail provided on a vertical wall surface of column 4, swivel slide 6 that rotatably supports spindle device 5 in the A-axis direction, and table 8 that is erected on second bed 7 at a position facing spindle device 5 and directly moves in the X-axis direction which is perpendicular to the surface of the paper. Work 11 is held by table 8 via angle plate 9. Scrap conveyer device 14 is arranged between first bed 3 and second bed 7.

Referring to FIG. 1, spindle device 5 of the first embodiment includes housing 12 that has openings at both the front and rear ends thereof, and cylindrical spindle 20 incorporated in housing 12. Spindle device 5 is cantilevered by head stock 13 (FIG. 2) via swivel slide 6 (FIG. 2) that rotates and moves in the O-axis direction. Spindle device 5, further, rotates and moves in the A-axis direction due to a servo motor. In housing 12 of spindle device 5, spindle 20 is rotatably supported by a plurality of bearings 30, 31, 32 arranged at the front and rear of the spindle in the lengthwise direction thereof, and is rotated by a built-in motor. The built-in motor includes stator 40 on the fixed side and rotor 41 on the moving side, stator 40 being fixed to the inner circumferential surface of housing 12, and rotor 41 facing to stator 40 via a very small gap in the radial direction and being shrinkage-fit to the outer circumferential surface of spindle 20 via shrinkage-fit sleeve that is not shown.

The front part of spindle 20 is rotatably supported by a pair of bearings 30, 31. The pair of bearings 30, 31 have their inner wheels 30a, 31a fixed to spindle 20 via collar 24 for inner wheels, and have their outer wheels 30b, 31b fixed to housing 12 via collar 35 for outer wheels. Bearing 30 on the left side is pushed by bearing case 36 attached to an opening portion at the front end of housing 12 so will not to be removed. Rear part 20a of spindle 20 is rotatably supported by bearing 32.

Spindle 20 has draw bar 22 for clamping tool holder 51 at the distal end of spindle 20. A plurality of initially coned disc springs 23 are inserted in the outer circumferential surface in nearly the intermediate portion of draw bar 22 in the lengthwise direction. The size and number of initially coned disc springs 23 are so set that a predetermined drawing force acts on tool holder 51 and in this embodiment is so set that a drawing force of 30 KN (3000 kgf) is produced. The plurality of initially coned disc springs 23 are provided between initially coned disc spring holder 25 of the right side screwed onto draw bar 22 and draw bar turn stop 26. Draw bar turn stop 26 is so fixed that draw bar 22 and spindle 20 rotate integrally together while permitting draw bar 22 to move in the axial direction. Draw bar 22 is urged rearward at all times by the resilient force of initially coned disc springs 23, and tool holder 51 is clamped with the predetermined drawing force. As draw bar 22 is pushed forward by unclamping device 60 that will be described later, draw bar 22 as well as an initially coned disc spring holder 25 move forward whereby initially coned disc springs 23 are compressed, and tool holder 51 can be taken out.

Spindle 20 at its from part has tool-attaching portion 27 forming tapered hole 27a enabling tool holder 51 to be detachably attached thereto. A plurality of collets 28 are arranged in tapered hole 27a maintaining an equal distance in the circumferential direction as clamp fittings that can be expanded and contracted in the radial direction. Collets 28 are fitted at their proximal ends between flange 29 protruding on the inner circumferential surface of spindle 20 and a front end surface of draw bar turn stop 26. Draw bar 22 is inserted in central through hole 28a of collets 28. Draw bar 22 is forming thick portion 22a at its distal end. As draw bar 22 moves rearward due to the resilient force of initially coned disc springs 23, collets 28 expand their inner diameter whereby the tapered surface of tool holder 51 inserted in tapered hole 27a and the rear end surface (not shown) of the flange come in contact with the tapered surface of tapered hole 27a and with front end surface 20a of spindle 20; i.e., tool holder 51 is fixed to tool-attaching portion 27 relying on a so-called two-surface locking. Tool-attaching portion 27 of this embodiment is so constituted that an HSK shank of a 1/10 short taper can be attached as tool holder 51. It, is, however, also allowable to so constitute tool-attaching portion 27 that a BT shank of a 7/24 taper can be attached. In the case of the BT shank, tool-attaching portion 27 is so constituted that the pull-stud fixed to the rear end of the shank is held by collets 28. Tool holder 51 holds tool 50 that has a predetermined length of protrusion and a predetermined diameter.

Unclamping device 60 is inserted in through hole 21 of spindle 20 at the rear part thereof. Unclamping device 60 includes piston 63 that reciprocally moves in annular space 55 between spindle 20 and draw bar 22 in the axial direction of draw bar 22, cylinder 70 on the fixed side having at its end annular engaging portion 75 for guiding piston 63 to reciprocally move in annular space 55 between spindle 20 and draw bar 22, and a fluid feed device that is not shown for feeding a fluid with a predetermined pressure to first pressure chamber 77 and second pressure chamber 78 formed as piston 63 and cylinder 70 are engaged with each other.

Piston 63 has large diameter portion 64 and small diameter portion 5 protruding like a boss from large diameter portion 64. Small diameter portion 65 has contacting portion 65a formed in the inner circumferential portion thereof to come in contact with shoulder portion 22b of draw bar 22, while large diameter portion 64 has annular groove 66 formed therein and in which annular engaging portion 75 of cylinder 70 will fit so as to freely move therein. Small diameter portion 65 of piston 63 has its inner wheel 80a without track groove fixed to the outer circumferential surface of small diameter portion 65, and has its outer wheel 80b having track groove rotatably supported by spindle 20 through first radial bearing 80 fixed to bearing support portion 84 provided in the inner circumferential surface of spindle 20. Further, small diameter portion 65 of piston 63 is allowed to move in the axial direction of spindle 20 in a state of being limited from moving in the radial direction. Large diameter portion 64 of piston 63 has its inner wheel 82a without track groove fixed to the outer circumferential surface of draw bar 22, and has its outer wheel 82b having track groove rotatably support the rear part of draw bar 22 via secondary radial bearing 82 that is fixed to the inner circumferential surface of large diameter portion 64. Further, large diameter portion 64 of piston 63 is allowed to move in the axial moving direction of spindle 20 in a state of being limited from moving in the radial direction.

Figure 3:
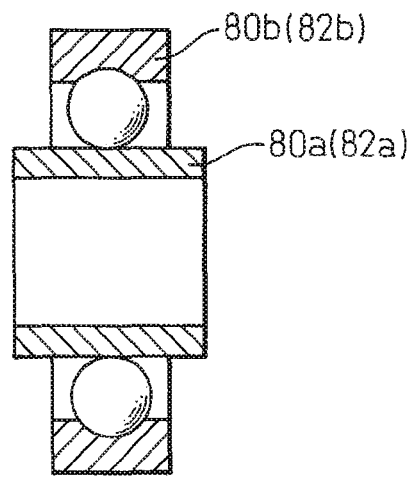
FIG. 3 is a sectional view illustrating the constitution of a first radial bearing and a second radial bearing for movably supporting a piston of an unclamping device in the first embodiment.

FIG. 3 is a sectional view illustrating the constitution of first radial bearing 80 and second radial bearing 82 constituted by inner wheels 80a, 82a without track groove and outer wheels 80b, 82b having track groove. In first radial bearing 80 of this embodiment, inner wheel 80a is fixed to the outer circumferential surface of small diameter portion 65 of piston 63. Without providing inner wheel 80a, however, small diameter portion 65 may be made of a highly hard material, and the outer diameter of small diameter portion 65 may be selected to be nearly the same as the outer diameter of inner wheel 80a. In second radial bearing 82, similarly, inner wheel 82a is fixed to the outer circumferential surface of draw bar 22. Without providing inner wheel 82a, however, draw bar 22 may be made of a highly hard material, and the outer diameter of draw bar 22 may be selected to be nearly the same as the outer diameter of inner wheel 82a.

Further, even by constituting first and second radial bearings 80 and 82 by using the inner wheel having track groove and the outer wheel without track groove, piston 63 can be moved relative to spindle 20 and draw bar 22 in the axial direction thereof.

Cylinder 70 includes flange portion 73 of a large diameter fixed to an open end of bearing case 37, body portion 74 which is continuous to flange portion 73 and is inserted in through hole 21 of spindle 22, and annular engaging portion 75 continuous to body portion 74 and engages with annular groove 66 of piston 63. At a distal end of annular engaging portion 75, partition wall portion 75a is formed to separate the space in annular groove 66 of piston 63 into the front part and the rear part in the direction in which piston 63 moves reciprocally.

In a state were annular engaging portion 75 of cylinder 70 is engaged with annular groove 66 of piston 63, first pressure chamber 77 is formed in front of partition wall portion 75a and second pressure chamber 78 is formed at the back of partition wall portion 75a. Through a fluid port that is not shown, second pressure chamber 78 is filled with a fluid with a predetermined pressure from a fluid feed device; i.e., second pressure chamber 78 expands and first pressure chamber 77 contracts. Therefore, piston 63 moves back toward the rear of spindle 20 and draw bar 22 moves toward the rear of spindle 20 due to the resilient force of initially coned disc springs 23. Accordingly, tool holder 51 is drawn into tapered hole 27a of tool-attaching portion 27 and is clamped therein. Conversely, upon filling first pressure chamber 77 with the fluid with the predetermined pressure so that first pressure chamber 77 expands and second pressure chamber 78 contracts, piston 63 is caused to move toward the front of spindle 20, contacting portion 65a provided in small diameter portion 65 of piston 63 comes in contact with shoulder portion 22b of draw bar 22, whereby draw bar 22 moves toward the front of spindle 20 overcoming the resilient force of initially coned disc springs 23. Tool holder 51 is, thus, unclamped.

Seal ring 85 having a center hole is fixed to the rear end of extended portion 22c of draw bar 22 that is inserted in piston 63 and cylinder 70 of unclamping device 60. Seal ring 85 of draw bar 22 comes in contact with seal ring 91 having a center hole of rotary joint 90 whereby a cutting oil is fed to oil hole 45 in draw bar 22 through rotary joint 90 and is guided to an end of tool 50 in a spindle-through system.

Rotary joint 90 includes joint cylinder 93 disposed in an inner space in body portion 74 of cylinder 70, and joint piston 94 provided in joint cylinder 93 to reciprocally move in the axial direction of spindle 20. Joint piston 94 includes piston body 95 having oil hole 95a therein, and flange portion 96 protruding in a direction at right angles with the axial direction of piston body 95. Flange portion 96 partitions the space in joint, cylinder 93 into air pressure chamber 98 and spring chamber 99. Coil spring 101 is arranged in spring chamber 99 to urge joint piston 94 rearward. Air pressure port 98a is connected to air pressure chamber 98 to feed the compressed air therein. The external air pressure source (not shown) is connected to air pressure port 98a so that the compressed air can be fed from the air pressure source into air pressure chamber 98 or that the air can be discharged from air pressure chamber 98. To feed the cutting oil, the air is fed into air pressure chamber 98 to move joint piston 94 leftward overcoming the urging force of coil spring 101, and seal ring 91 of rotary joint 90 is brought in contact with seal ring 85 of draw bar 22. Thus oil hole 95a of rotary joint 90 communicates with oil hole 45 of draw bar 22, and the cutting oil is fed to a machining region between a cutter blade of tool 50 and work 11. On the other hand, upon discharging the air from air pressure chamber 98, joint piston 94 moves toward the right due to the urging force of coil spring 101, seal ring 91 of rotary joint 90 separates away from seal ring 85 of draw bar 22, and the cutting oil is no longer supplied.

According to the spindle device of this embodiment as described above, unclamping device 60 is incorporated in through hole 21 in the rear part of spindle 20 making it possible to shorten the overall length of spindle device 5. This shortens the distance between the point where the cutting force of tool 50 acts and the center of rotation of the A-axis which is the support point of spindle device 5 or a guide surface of head stock 13 of column 4. Therefore, a relatively small moment load acts on the support portion of the spindle device, and the machining can be executed maintaining stability. With the overall length being shortened, further, spindle device 5 is little deflected as a whole when the cutting force is exerted, and the work is machined maintaining an increased precision. Further, spindle device 5 having a shortened overall length can be preferably adapted to a machine tool of the type that has a tilted feed shaft of A-axis or B-axis or that has a swing feed shaft of C-axis on the side of the spindle device to expand the moving range of spindle 20.

Figure 4:
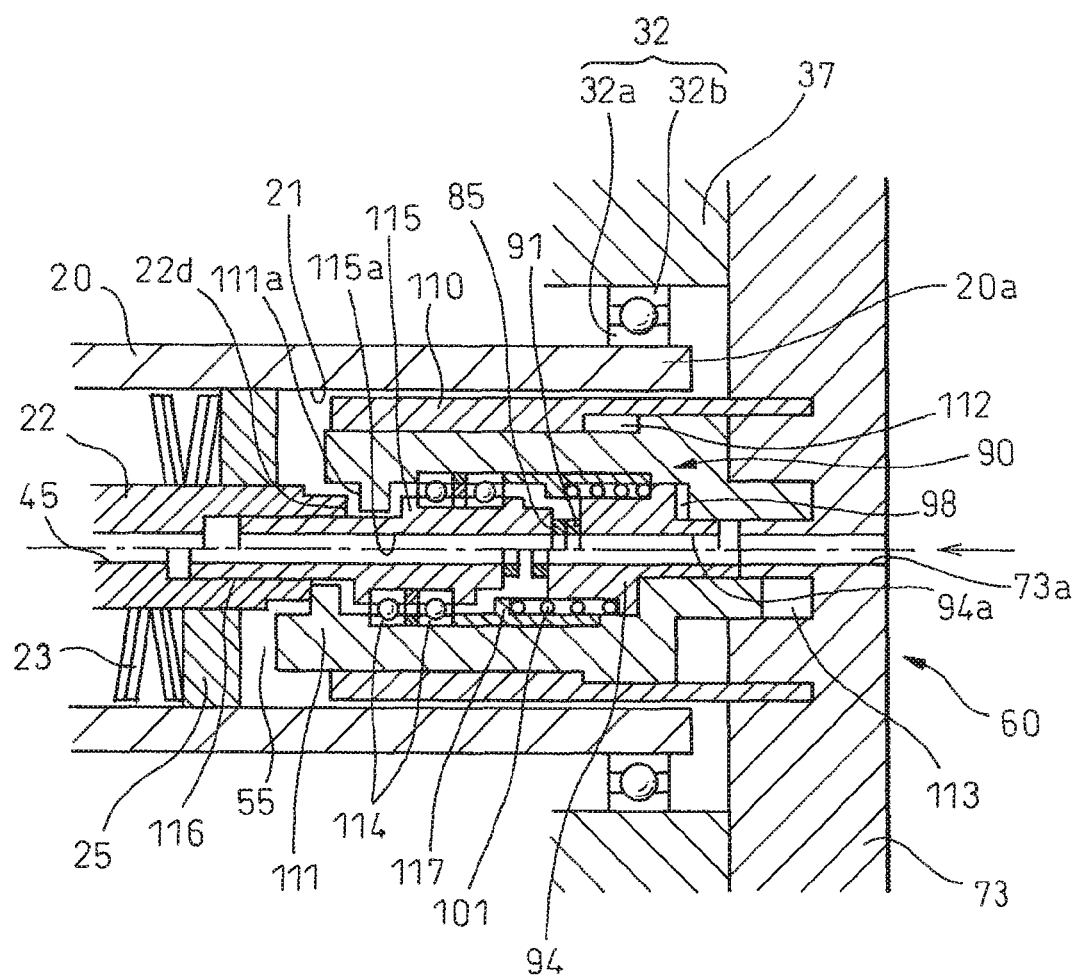
FIG. 4 is a sectional view of the spindle device in the machine tool according to a second embodiment of the present invention, and shows a rear portion only which is different from the first embodiment.

Next, spindle device 5 of the machine tool according to a second embodiment of the invention will be described with reference to FIG. 4. FIG. 4 is a sectional view showing a rear portion only of spindle device 5 according to the second embodiment. The portions that are not shown are the same as those of the first embodiment and are not described here again. The upper side of the center axis illustrates a state where tool holder 51 is clamped, and the lower side illustrates an unclamped state. The same members as those of the first embodiment are denoted by the reference numerals which are the same as those of FIG. 1.

Cylinder 110 of unclamping device 60 is protruding from flange portion 73 into annular space 55 between rear part 20a of the spindle and draw bar 22, and piston 111 is fitted in cylinder 110. Upon feeding a pressurized fluid into pressure chamber 112, piston 111 moves toward the rear of the spindle and upon feeding the pressurized fluid into pressure chamber 113 provided in flange portion 73, piston 111 moves toward the front of the spindle. Support shaft 115 is provided in piton 111 via a pair of bearings 114, the front part of support shaft 115 being fitted in the rear part of draw bar 22. In coupling portion 116, support shaft 115 and draw bar 22 are spline-coupled or polygonally coupled, and are not allowed to rotate relative to each other but are allowed to move in the axial direction. Seal ring 85 is fixed to the rear end of support shaft 115, and oil hole 115a is formed along the center axis thereof. Support shaft 115 rotates together with draw bar 22, and is supporting piston 111 through bearing 114.

On the other hand, rotary joint 90 is constituted inside piston 111. Joint piston 94 is fitted to a rear part of piston 111 in the inside thereof without being allowed to rotate relative to piston 111 but being allowed to move in the axial direction to form air pressure chamber 98. Further, coil spring 101 is contained in spring case 117 provided in the inner circumference of piston 111 to urge joint piston 94 rearward. Seal ring 91 is fixed to the front end surface of joint piston 94, and oil hole 94a is formed along the center axis thereof. When no cutting oil is to be fed from oil, hole 73a of flange portion 73, no compressed air is fed into air pressure chamber 98, and joint piston 94 moves rearward being urged by coil spring 101, and seal rings 85 and 91 are separated away from each other. When the cutting oil is to be fed, the compressed air is fed to air pressure chamber 98, whereby seal rings 85 and 91 are brought in contact together, and oil holes 73a, 94a, 115a and 45 are communicated with one another.

Next, described below is the operation of unclamping device 60 of this embodiment. If the pressurized fluid is fed into pressure chamber 112 to separate piston 111 away from rear end 22d of draw bar 22, then draw bar 22 moves toward the rear of the spindle being urged by initially coned disc springs 23 to clamp tool holder 51. If the pressurized fluid is fed into pressure chamber 113 to bring protuberance 111a of piston 111 into contact with rear end 22d of draw bar 22 and, further, to push draw bar 22 toward the front of the spindle, then tool holder 51 is unclamped. Spindle 20, initially coned disc spring holder 25, draw bar 22, support shaft 115 and sealing ring 85 undergo rotation while flange portion 73, cylinder 110, piston 111, spring case 117, coil spring 101 and joint piston 94 do not rotate. Therefore, a gap remains between the inner circumference of, through hole 21 of spindle 20 and the outer circumference of cylinder 110. Seal rings 85 and 91 rotate relative to each other and in contact with each other, and are, therefore, made of ceramics that wears little.

REFERENCE SIGNS LIST 1 horizontal type machining center
5 spindle device
20 spindle
22 draw bar
27 tool-attaching portion
51 tool holder
60 unclamping device
63 piston
66 annular groove
70 cylinder
75 annular engaging portion
77 first pressure chamber
78 second pressure chamber
80 first radial bearing
82 second radial hearing

The invention claimed is:

1. A spindle device of a machine tool including a cylindrical spindle supported by a housing so as to rotate and a draw bar provided along the axis of rotation of the spindle to draw a tool holder to the distal end of the spindle to clamp it, and further including an unclamping device supported by said housing and is provided in an annular space between the inner circumference of said spindle and the outer circumference of said draw bar;
   wherein said unclamping device has a piston that moves said draw bar toward a front of the spindle by utilizing a fluid pressure; and
   wherein said piston of said unclamping device is rotatably supported in the inner circumferential surface of said spindle by a first radial bearing, said first radial bearing being so constituted that an inner wheel or an outer wheel thereof has no track groove enabling said piston to move in the axial direction of said spindle.

2. The spindle device of a machine tool according to claim 1, wherein a rear part of said draw bar is rotatably supported by said piston of said unclamping device via a second radial bearing, said second radial hearing being so constituted that an inner wheel or an outer wheel thereof has no track groove enabling said piston to move in the axial direction of said spindle.

3. A spindle device of a machine tool including a cylindrical spindle supported b by a housing so as to rotate and a draw bar provided along the axis of rotation of the spindle to draw a tool holder to the distal end of the spindle to clamp it, and further including an unclamping device supported by said housing and provided in an annular space between the inner circumference of said spindle and the outer circumference of said draw bar;

wherein said unclamping device has a piston that moves said draw bar toward a front of the spindle by utilizing a fluid pressure; and wherein the spindle device further includes a spline shaft or a polygonal shaft that is rotatably supported in the inner circumference of the piston of said unclamping device and fits to a spline hole or a polygonal hole formed in the rear end of said draw bar, and a support shaft that rotates together with said draw bar and moves in the axial direction of said spindle relative to said draw bar.

* * * * *